| United States Patent [19] | [11] Patent Number: 4,815,229 |
|---|---|
| Nicholson, III | [45] Date of Patent: Mar. 28, 1989 |

[54] DIVING JIG

[75] Inventor: Oscar T. Nicholson, III, 6428 Weems Ave., Fairhaven, Md. 24754

[73] Assignees: Oscar T. Nicholson, III, Fairhaven; Rock M. Nicholson, Sr., North Beach, both of Md.

[21] Appl. No.: 110,345

[22] Filed: Oct. 20, 1987

[51] Int. Cl.$^4$ .............................................. A01K 85/00
[52] U.S. Cl. .................. 43/42.47; 43/42.48; 43/42.28
[58] Field of Search ................ 43/42.28, 42.47, 42.48, 43/42.22

[56] References Cited

U.S. PATENT DOCUMENTS

| 1,663,080 | 3/1928 | Heddon | 43/42.48 |
|---|---|---|---|
| 1,700,061 | 1/1929 | Kimmich | 43/42.28 |
| 1,997,900 | 4/1935 | Edwards | 43/42.47 |
| 2,523,949 | 9/1950 | Gambill | 43/42.47 |
| 3,187,457 | 6/1965 | Karich | 43/42.47 |
| 3,702,035 | 11/1972 | Pope | 43/42.48 |
| 3,855,722 | 12/1974 | Moore | 43/42.28 |
| 4,044,491 | 8/1977 | Potter | 43/42.28 |
| 4,045,903 | 9/1977 | Parker | 43/42.28 |
| 4,738,047 | 4/1988 | Ryan | 43/42.47 |

Primary Examiner—Kurt Rowan
Attorney, Agent, or Firm—Dennison, Meserole, Pollack & Scheiner

[57] ABSTRACT

A diving jig including a generally spherical floating head with a forwardly directed downwardly inclined diving lip and a single upwardly directed barbed hook rigidly extending rearwardly and downwardly from the head in longitudinal alignment with the lip. Both the lip and hook define stabilizing means for the jig for retention thereof with the hook upwardly directed.

5 Claims, 1 Drawing Sheet

DIVING JIG

BACKGROUND OF THE INVENTION

The present invention relates to fishing lures of the type normally referred to as jigs.

Jigs, in the many forms thereof, usually comprise a compact head, either weighted or floating, with a barbed hook extending therefrom and a loop or eye for securing the jig to a fishing line. The head of the jig is normally of a basic spherical or oblong configuration without any bait-simulating features, other than for possibly a decorative "eye". The jig itself, as opposed to bait-simulating lures, relies on other means for the attraction of fish, for example artifical or live bait mounted on the hook. The jig, as desired, may also be provided with streamers.

Conventional jigs, whether weighted sinking jigs or floating jigs, are rather restricted in use with the weighted jigs being limited to below surface jigging and the floating jigs limited to surface jigging.

While diving plugs or lures are known, such lures incorporate simulative bodies, simulating for example minnows or the like, with multiple hook sets suspended therefrom. Such lures, sometimes referred to as crankers, incorporate forwardly inclined bills to which the line is secured in a manner whereby a forward pulling of the line will produce a reactive force against the bill and a downward pivoting thereof which in turn results in a downward diving of the lure.

The multiple hooks normally associated with diving lures frequently result in an improper or premature hooking of the fish for a less than acceptable securing of the fish. The same general problem can arise from the use of single-hook jigs wherein the orientation of the hook is not controlled.

The known jigs, comprising either floating jigs or weighted jigs, while producing a limited degree of movement to live or artifical bait attached thereto, do not provide a particularly life-like movement due to the rather restrictive zone of use, either on the surface for floaters or below the surface for weighted jigs.

SUMMARY OF THE INVENTION

The jig of the present invention differs from known jigs in several areas which provide significant features and advantages heretofore unavailable in jigs.

The jig of the invention is a diving jig, that is a jig which, when at rest or when pulled slowly will remain on the surface and, through the configuration of the head or body, produce a natural appearing wiggling action which is translated to any appropriate bait mounted on the hook, for example, a minnow body, live or rubber worms, pork rind, etc. As the jig is more rapidly drawn through the water or retrieved, the reactive forces of the water against a diving bill or lip projecting forwardly from the jig head will produce a diving of the jig, and secured bait, below the surface, while at the same time retaining the desirable wiggling motion resulting primarily from the shape of the head.

The most effective manner of hooking a fish is through the upper jaw thereo. In light of the conventional hook arrangement on jigs and lures, whether or not a fish is hooked in this manner is basically a matter of chance. It is a significant object of the invention to mount the hook in a manner which insures an upward directing of the hook for, in the normal course of events, a downward engaging of the upper jaw of a fish therewith. This is achieved by effecting a balanced orientation of the diving lip and the hook to opposite sides of the central floatation body or head with both the lip and hook angling outwardly and downwardly at generally similar acute angles to the horizontal whereby both the lip and the hook will normally be retained immediately below the water surface. The hook itself will be mounted to upwardly direct the barbed end. Formed in this manner, the jig will automatically assume a floating position with the relatively heavier lip and hook below the floation body and the hook upwardly directed. The hook will be retained in this position throughout normal controlled movement of the jig. The use of a single hook provides for a more secure hooking of the fish and, particularly in conjunction with the upward orientation of the hook, a generally weedless construction. The ability to avoid weeds can be enhanced by the provision of a weed guard projecting from the head toward and into general overlying relation to the hook.

The jig, other than for the generally flattened spherical configuration of the head which has been found to provide a highly effective wiggling action, has no "bait" configuration. Rather, the bait body is left to the discretion of the user, and can comprise soft plastic or rubber bodies, pork rind, live or dead bait, and the like, normally mounting directly on the single upwardly directed hook with a live action movement being introduced to the bait body by the combined diving and wiggling action produced as the jig is drawn through the water and vertical movement thereof controlled by the associated forwardly directed lip.

Other objects and advantages of the invention will become apparent from the more detailed description of the invention following hereinafter.

DESCRIPTION OF PREFERRED EMBODIMENT

Figure 1:
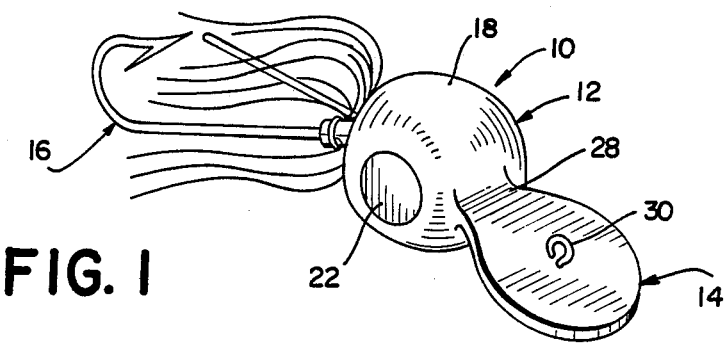
FIG. 1 is a perspective view of the diving jig of the invention.
Figure 2:
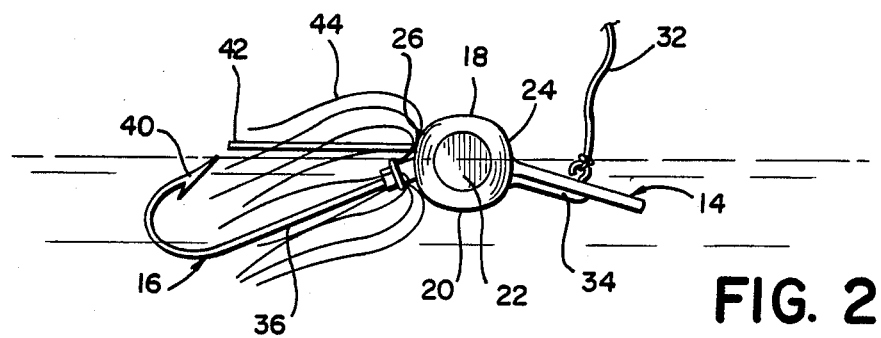
FIG. 2 is a side elevational view of the jig floating at surface level, the position naturally assumed with no or little tension in the line.

Referring now more specifically to the drawings, the diving jig 10 of the invention comprises a buoyant head 12 with a forwardly directed lip diving 14 and a rearwardly extending single hook 16.

The jig head 12, either hollow or solid and of any appropriate buoyant material such as plastic or wood, is of a basically spherical configuration. The jig is specifically intended to include multiple movements, principally both a diving action and, in conjunction with movement of the jig through the water, a distinctive wiggling.

The wiggling movement, achieved by a manipulation of the fishing line, normally as the jig is being retrieved, is principally a function of the configuration of the head. With regard thereto, and as noted in the drawings, the head 10 is basically spherical with slightly flattened upper and lower faces 18 and 20, and planar opposed side faces 22. The front and rear faces, respectively designated at 24 and 26, retain a basically spherical contour.

The lip 14, either integral with or otherwise fixedly joined to the forward or front surface 24 of the head 12, projects forwardly therefrom downwardly at an acute angle to the horizontal. The lip 14 is basically a flat rigid panel of broad elliptical shape with one narrowing end thereof defining a neck portion 28 joining the head 12. An upwardly projecting eye or loop 30 extends centrally from the lip 14 and defines an anchor point for the fishing line 32. The upper surface of the lip 14 is planar. The under surface of the lip can include an enlarged rib or central portion 34 to accommodate a mounting post on the eye 30 which may, as desired, be a screw eye.

Figure 4:
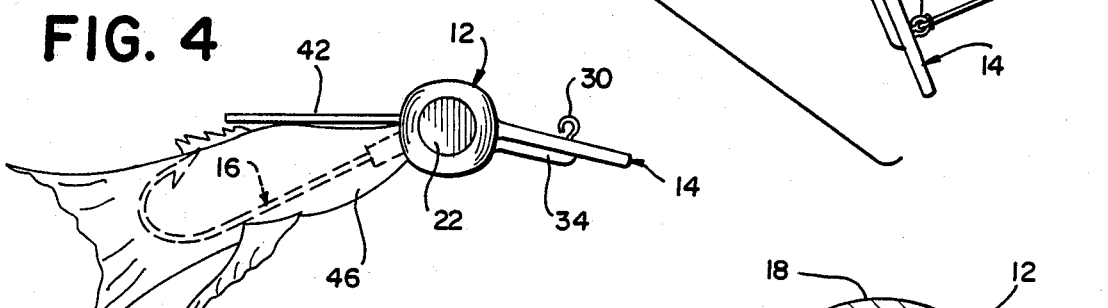
FIG. 4 is a side elevational view of the lure with the body of a bait fish mounted thereon.
Figure 5:
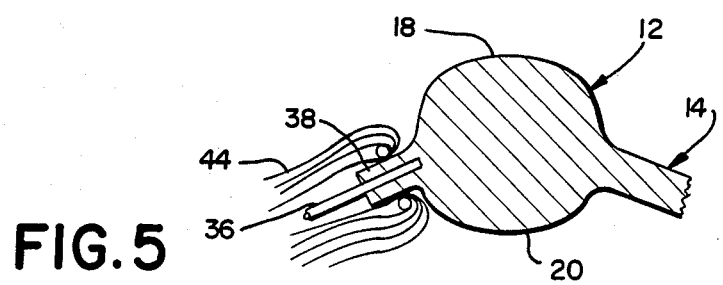
FIG. 5 is a longitudinal cross-sectional detail through the head of the jig.

The single hook 16 has the outer end of the shank 36 thereof extending into anchored engagement with the spherically configured face portion of the head 12, preferably through an elongate cylindrical extension 38 which additionally defines a bait keeper for stablizing mounted bait as suggested in FIG. 4. The hook is rearwardly and downwardly angled at an acute angle to the horizontal similar to the angle of the lip 14, and terminates in a reversly directed upwardly positioned barbed end 40.

The front-to-rear longitudinal alignment of the lip 14 and hook 16, as well as the downward and outward inclination of both relative to the central floating head 12 provide a jig which assumes a stable floating position wherein the natural tendency of the jig is to maintain itself in water with the hook upwardly directed to insure engagement with the upper lip or jaw of a striking fish. The depending relationship of the lip and hook relative to the floating head provide a substantial degree of stability, and in fact preclude any possibility of the jig inverting or floating in other than the upright position suggested in the drawings.

Figure 3:
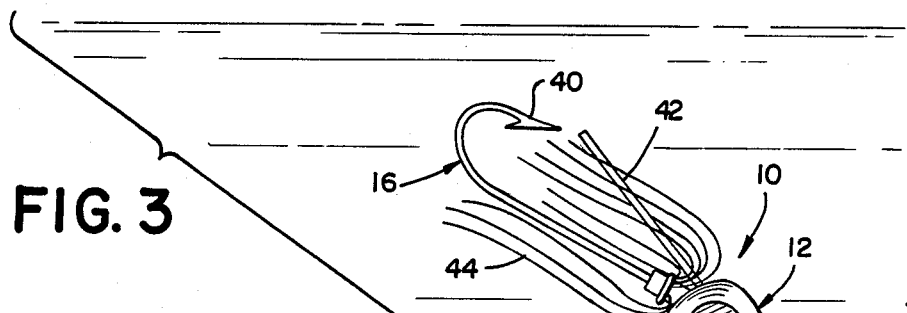
FIG. 3 is a view of the jig diving below the surface in response to a tensioning of the line.

Noting FIG. 3, as the jig is retrieved or otherwise forcably moved through the water, the reactive force of the water on the upper surface of the lip 14 causes a further downward inclination of the lip 14 and a diving of the jig with the movement of the jig through the water and the flow of water about the jig producing a distinctive wiggling or swimming motion. As suggested in FIG. 3, the single hook remains upwardly directed which not only tends to position the hook for proper engagement with the upper jaw of a fish, but also maintains the hook in a non-snagging or weedless position. As desired, the weedless nature of the hook can be enhanced by the provision of an appropriate weed guard 42 affixed to and extending rearwardly from the head 12 to a point in general spaced overlying relation to the barbed hook end 40. A also suggested in the drawings, the appearance of the lure can be enchanced by the provision of hair, rubber strings or feathers 44 tied to the keeper projection 38.

Noting FIG. 4, the jig 10 is particularly adapted to mount a wide variety of baits including rubber, plastic, live or food baits. As illustrated, the single hook construction mounts a headless minnow 46 or the like with the jig head 12 assuming the appearance of the fish head. This appearance may be further enhanced by the provision of eye simulations on the opposed flattened side surfaces 22. It will be noted that the mounted bait similarly angles below the horizontal, thus maintaining the desired upward orientation of the single hook. Bait, particularly artifical rubber or plastic bait, can alternatively be mounted on the guard rod 42 to lie in overlying relation to the hook end 40, either free thereof or fixed thereto.

The unique movement of the jig, both diving and wiggling, is effectively produced regardless of the bait mounted thereon. It is also significant that the jig of the invention is not limited to either surface jigging or below surface jigging. To the contrary, Applicant's jig, while specifically proposed as a jig which effectively dives and operates below the surface, will, alternatively, comprise an effective wiggling surface jig when the retrieval force on the line is sufficiently reduced so as to not counteract the natural buoyancy of the jig. Thus, the versitility of the jig is substantially enhanced. It is also to be appreciated that such changes in the appearance of the jig, and in particular the coloration thereof, may be made as desired without detracting from the structural uniqueness thereof as described and hereinafter claimed.

I claim:

1. A diving jig comprising a buoyant head, said head, in a horizontal orientation of the jig, having a generally spherical configuration with projection-free upper and lower surfaces, said head being shaped to include slightly flattened opposed side surfaces, a generally planar diving lip fixed to said front face and projecting forwardly from said head and downwardly relative thereto at an acute angle to the horizontal whereby a forcible forward movement of the jig in a body of water will cause a downward pivoting of the lip and a diving of the jig, and a single hook having an elongate rigid shank and a reversely turned hook end, said shank being fixed to said head with the hook extending rearwardly from the rear face of the head and downwardly relative to the head at an acute angle to the horizontal and with the hook end oriented remote from said head, said lip and said hook being in general longitudinal alignment, and whereby the jig, at rest in a body of water, floats horizontally with the lip and hook angling downward from the head into the body of water.

2. The diving jig of claim 1 wherein the hook end is upwardly directed for hooking engagement with the upper jaw of a striking fish.

3. The diving jig of claim 2 including a hook guard fixed to said head and projecting rearwardly therefrom into general overlying relation to the hook end.

4. The diving jig of claim 2 including a cylindrical keeper integral with said head and projectin therefrom in surrounding relation to the portion of the hook shank adjacent the head, and hair-like means mounted on said keeper and extending rearwardly therefrom about said hook.

5. The diving jig of claim 1 wherein said upper and lower surfaces are slightly flattened.

* * * * *